US012687401B2

(12) United States Patent (10) Patent No.: US 12,687,401 B2
Selvam et al. (45) Date of Patent: Jul. 21, 2026

(54) MACHINE LEARNING BASED ENERGY USE PREDICTION

(71) Applicant: EXERGI PREDICTIVE LLC, Hugo, MN (US)

(72) Inventors: Harish Panneer Selvam, Littleton, CO (US); Andrew Kotz, Denver, CO (US); William Northrop, Minneapolis, MN (US)

(73) Assignee: EXERGI PREDICTIVE LLC, Hugo, MN (US)

( * ) Notice: Subject to any disclaimer, the term of this patent is extended or adjusted under 35 U.S.C. 154(b) by 33 days.

(21) Appl. No.: 18/539,710

(22) Filed: Dec. 14, 2023

(65) Prior Publication Data

US 2025/0198775 A1    Jun. 19, 2025

(51) Int. Cl.
*G01C 21/34*    (2006.01)
(52) U.S. Cl.
CPC ..... *G01C 21/3469* (2013.01); *G01C 21/3484* (2013.01); *G01C 21/3492* (2013.01)
(58) Field of Classification Search
CPC ............ G01C 21/3469; G01C 21/3484; G01C 21/3492
See application file for complete search history.

(56) References Cited

U.S. PATENT DOCUMENTS

| | | | | |
|---|---|---|---|---|
| 9,702,719 | B2 * | 7/2017 | Mason | ................ G01C 21/3469 |
| 10,850,588 | B2 | 12/2020 | Northrop et al. | |
| 11,001,248 | B2 * | 5/2021 | Adam | ................... B60W 20/12 |
| 11,867,521 | B2 * | 1/2024 | Trangbaek | .......... B60W 40/105 |
| 11,960,298 | B2 * | 4/2024 | Amini | ................... B60W 60/00 |
| 12,044,537 | B2 * | 7/2024 | Trangbaek | ......... G01C 21/3822 |
| 12,097,751 | B2 * | 9/2024 | Briscoe | .................. G07C 5/004 |
| 2020/0089241 | A1 * | 3/2020 | Kao | ...................... G05D 1/0217 |
| 2020/0108732 | A1 | 4/2020 | Northrop et al. | |
| 2020/0116516 | A1 * | 4/2020 | Kim | ........................ B60L 58/10 |

OTHER PUBLICATIONS

Holden et al., RouteE: A Vehicle Energy Consumption Prediction Engine (Abstract), https://saemobilus.sae.org/content/2020-01-0939.
Esser et al., Stochastic Synthesis of Representative and Multidimensional Driving Cycles, Article ID: 2018-01-0095, SAE International, doi: 10.4271/2018-01-0095.
Battlefield-Ready, Multi-Platform Intelligent Energy Management Solution, Jul. 2023.

(Continued)

*Primary Examiner* — Ramsey Refai

(74) *Attorney, Agent, or Firm* — Edlavitch Law PLLC

(57) ABSTRACT

Techniques for using machine learning to predict the energy use of mobile actors such as a moving person or a mobile machine, as well as technologies for using such predictions. Energy use prediction for a moving person or a mobile machine can include an energy use prediction for a person or machine moving from one place to another regardless of the complexity of the corresponding route and the complexity of other variables involved. Mobile machines can include any type of mobile machine for any industrial or consumer use. Mobile machines can include watercraft, aircraft, terrestrial vehicles, automobiles, or robots, for example.

20 Claims, 6 Drawing Sheets

(56)            References Cited

OTHER PUBLICATIONS

Lee et al., Synthesis of Real-World Driving Cycles and Their Use for Estimating PHEV Energy Consumption and Charging Opportunities: Case Study for Midwest/U.S., IEEE Transactions on Vehicular Technology, vol. 60, No. 9, Nov. 2011.

Zhang et al., Development of heavy-duty vehicle representative driving cycles via decision tree regression, Transportation Research Part D: Transport and Environment vol. 95, Jun. 2021, 102843.

McWhirter et al., Tracked vehicle physics-based energy modelling and series hybrid system optimisation for the Bradley fighting vehicle, Jan. 2020, International Journal of Electric and Hybrid Vehicles 12(1):1 DOI:10.1504/IJEHV.2020.104271.

* cited by examiner

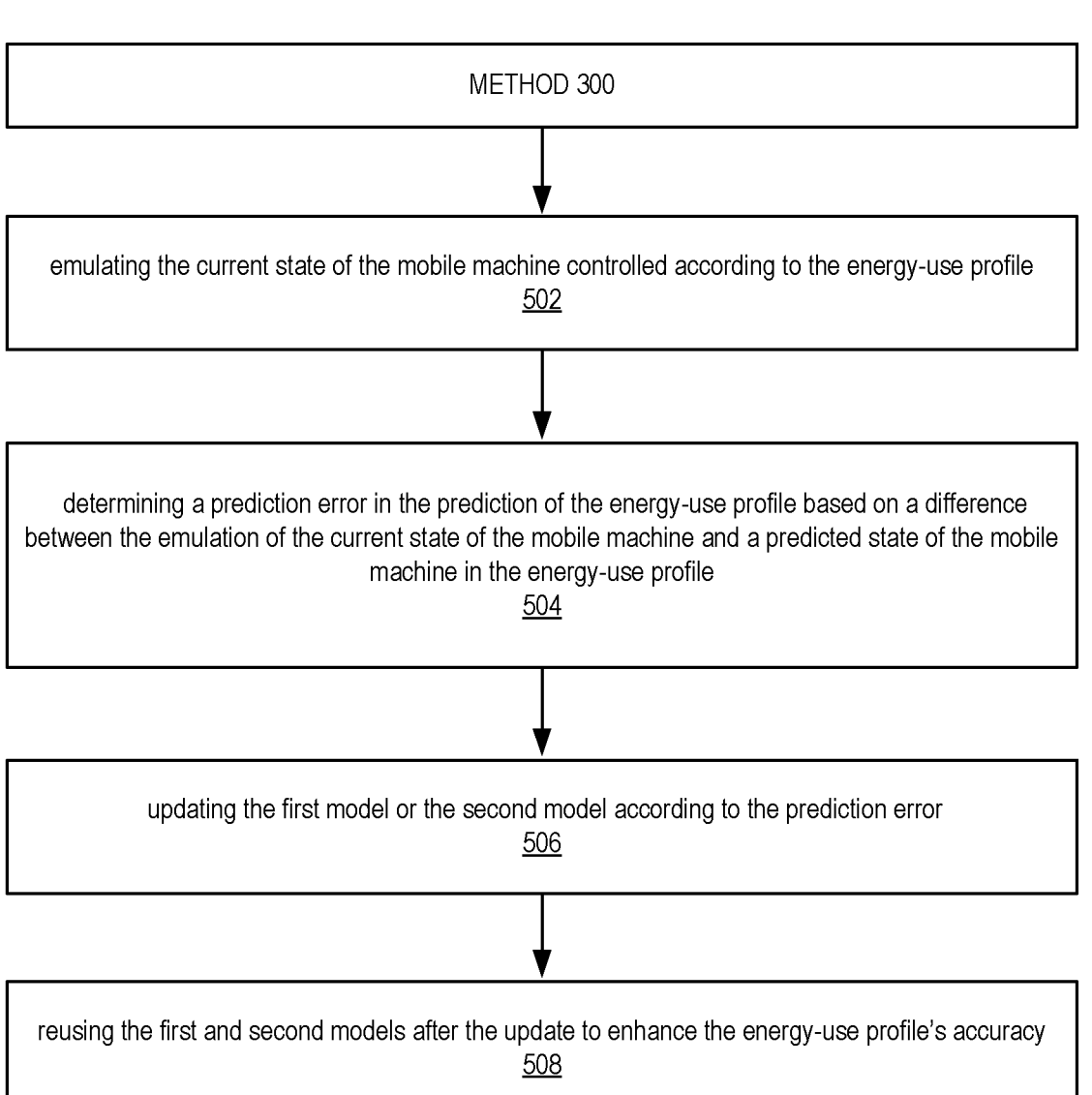

500

METHOD 300 emulating the current state of the mobile machine controlled according to the energy-use profile
502 determining a prediction error in the prediction of the energy-use profile based on a difference between the emulation of the current state of the mobile machine and a predicted state of the mobile machine in the energy-use profile
504 updating the first model or the second model according to the prediction error
506 reusing the first and second models after the update to enhance the energy-use profile's accuracy
508

FIG. 5

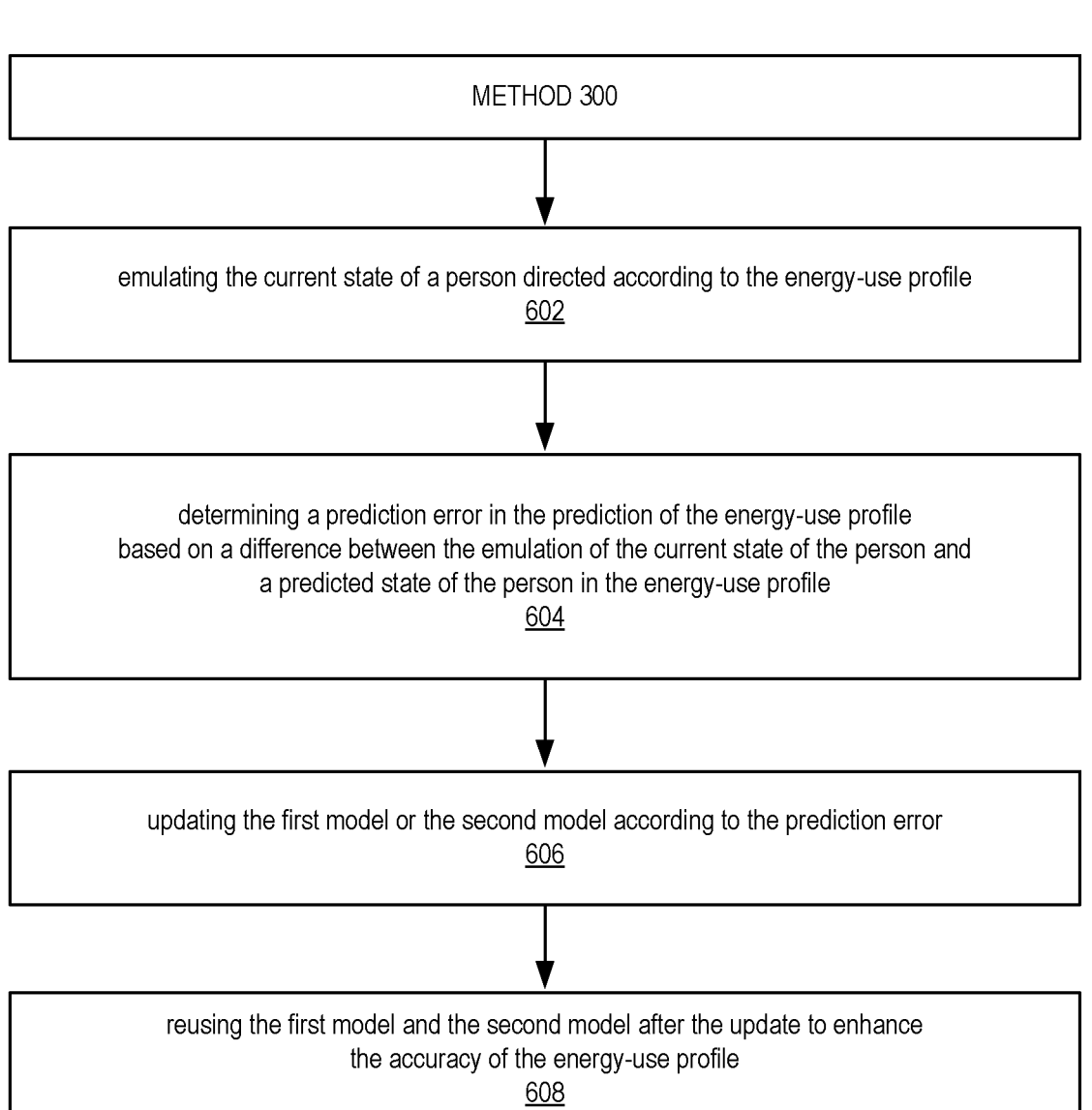

600

METHOD 300 emulating the current state of a person directed according to the energy-use profile
602 determining a prediction error in the prediction of the energy-use profile
based on a difference between the emulation of the current state of the person and
a predicted state of the person in the energy-use profile
604 updating the first model or the second model according to the prediction error
606 reusing the first model and the second model after the update to enhance
the accuracy of the energy-use profile
608

FIG. 6

700 using digital signal processing as a pre-processing step in at least some speed-time profile or energy-use profile determinations or in some of the corresponding data processing steps
702 inputting the enhanced input from the signal processing into an artificial neural network
704

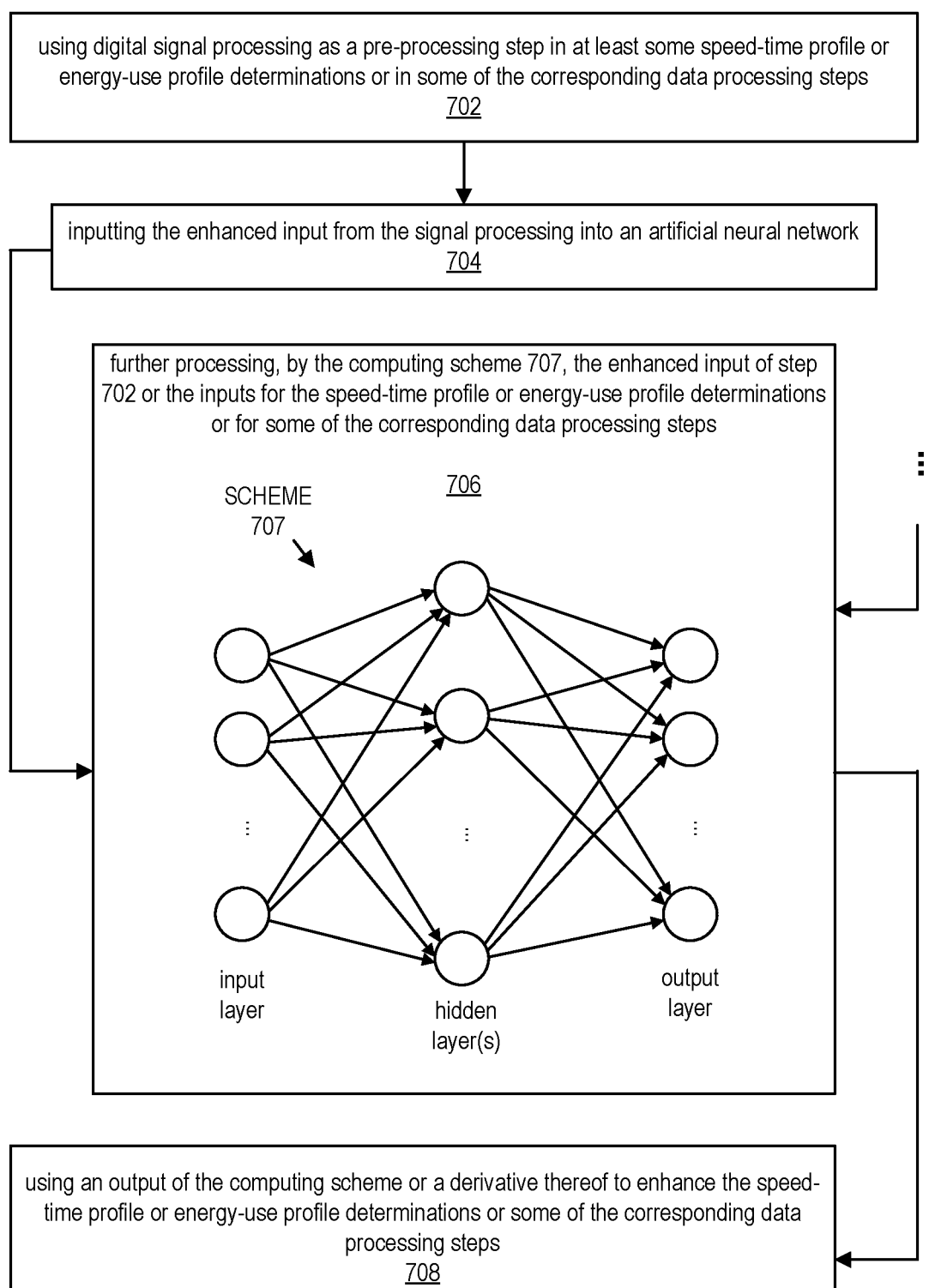

further processing, by the computing scheme 707, the enhanced input of step 702 or the inputs for the speed-time profile or energy-use profile determinations or for some of the corresponding data processing steps

SCHEME
707

706 input
layer hidden
layer(s)

output
layer using an output of the computing scheme or a derivative thereof to enhance the speed-time profile or energy-use profile determinations or some of the corresponding data processing steps
708

FIG. 7

MACHINE LEARNING BASED ENERGY USE PREDICTION

TECHNICAL FIELD

The present disclosure relates to methods and systems using machine learning to train models for energy use prediction as well as using the trained models for energy use prediction to inform, manage, or control an end-user such as a person or a mobile machine.

BACKGROUND

It is known to track the energy use or consumption of a moving end-user such as a moving person or a mobile machine. There are many applications, used via smart devices such as smartphones and watches, which can track the energy use of a person. Also, there are many applications, used via automotive information systems, which can track the energy use of automobiles. And, such applications have also evolved to track the energy use of just about any type of mobile machine from miniaturized aircraft and watercraft (e.g., drones) to large industrial equipment and vehicles for construction, forestry, farming, security, military use, etc.

More recently, computing systems have evolved to compute solutions for very complex problems as well as make predictions based on extremely complex variables. And, such solutions are being adopted and modified for many different industries. Thus, eventually, evolved computing systems should be able to more accurately provide energy use predictions of mobile human and machine actors. Even though there are complex interactions and variables to be considered in making such predictions, eventually with improved computing software and hardware energy use predictions can be made with high accuracy. Thus, it would be advantageous to provide a computing system (and associated method) that overcomes or at least mitigates one or more problems associated with the prior art systems and considers complex interactions between various factors in energy use predictions.

SUMMARY

Described herein are techniques for using machine learning to predict the energy use of mobile actors such as a moving person or a mobile machine, as well as technologies for using such predictions. Energy use prediction for a moving person can include an energy use prediction for a person moving from one place to another regardless of the complexity of the corresponding route and the complexity of other variables involved. Energy use prediction for a mobile machine can include an energy use prediction for a machine moving from one place to another, regardless of the complexity of the corresponding route and the complexity of other variables involved. Mobile machines can include any type of mobile machine for any industrial or consumer use. Mobile machines can include watercraft, aircraft, terrestrial vehicles, automobiles, robots, etc. The techniques disclosed herein provide specific technical solutions to at least overcome the technical problems related to energy use prediction mentioned in the background section or other parts of the application as well as other technical problems not described herein but recognized by those skilled in the art.

In some embodiments, the techniques include technologies that use machine learning to predict the energy use of mobile actors such as a moving person or a mobile machine, as well as technologies for using such predictions. With respect to some embodiments, disclosed herein are computerized methods using machine learning to predict the energy use of mobile actors as well as computerized methods using such predictions. Also, with respect to some examples, disclosed herein are examples of a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for improved systems and methods for using machine learning to predict the energy use of mobile actors such as a moving person or a mobile machine, as well as technologies for using such predictions.

For example, some embodiments include a method for using machine learning to predict the energy use of mobile actors such as a moving person or a mobile machine. In some cases, the method includes using such predictions for various purposes. In some examples, the method includes generating, by a computing system (e.g., see computing system 102 shown in FIG. 1 or computing system 200 shown in FIG. 2), a speed-time profile (e.g., see speed-time information 108a or 108b) for at least one route (such as an off-road route or an on-road route or a combination thereof) from a starting point to a destination point, based on a first model (e.g., see first model 106a or 106b) and a task profile (e.g., see task information 104) used as an input for the first model (e.g., see step 302 of method 300 show in FIG. 3). In some embodiments, such as where an end-user is a mobile machine, the speed-time profile includes or is part of a driving cycle. Also, in some examples, inputs can include the speed-time profile and vehicle or powertrain related parameters such as mass, aerodynamic drag coefficients, battery energy capacity, and a torque curve and power output of an engine or motor.

In some embodiments, such as where an end-user is a mobile machine, the speed-time profile includes or is part of a driving cycle. In some other embodiments, such as where an end-user is a wearable or holdable smart device, the speed-time profile includes or is part of an exercise routine or cycle. The method can also include predicting, by the computing system, an energy-use profile (e.g., see predicted energy-use information 118a or 118b) for the at least one route, based on a second model (e.g., see second model 116a or 116b) and the speed-time profile (e.g., see speed-time information 108a or 108b) used as an input for the second model (e.g., see step 304 of method 300). The method can also include using, by the computing system, the energy-use profile to at least partially control a mobile machine (e.g., see end-user device(s) 130) or to generate at least part of a user interface, such as a graphical user interface (GUI) or end-user interface 120 or end-user device(s) 130, according to data in the energy-use profile (e.g., see step 306 of method 300).

These and other important aspects of the invention are described more fully in the detailed description below. The invention is not limited to the particular methods and systems described herein. Other embodiments can be used and changes to the described embodiments can be made without departing from the scope of the claims that follow the detailed description. Within the scope of this application, it should be understood that the various aspects, embodiments, examples, and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The present disclosure will be understood more fully from the detailed description given below and from the accompanying drawings of various example embodiments of the disclosure.

FIGS. 3 to 7 illustrate methods in accordance with some embodiments of the present disclosure.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications, and equivalents as will become apparent from consideration of the following detailed description and other parts of this disclosure.

Described herein are techniques for using machine learning to predict the energy use of mobile actors such as a moving person or a mobile machine, as well as technologies for using such predictions. Energy use prediction for a moving person or a mobile machine can include an energy use prediction for the actor moving from one place to another regardless of the complexity of the corresponding route and the complexity of other variables involved. Mobile machines can include any type of mobile machine for any industrial or consumer use. Mobile machines can include watercraft, aircraft, terrestrial vehicles, automobiles, robots, etc. The techniques disclosed herein provide specific technical solutions to at least overcome the technical problems related to energy use prediction mentioned in the background section or other parts of the application as well as other technical problems not described herein but recognized by those skilled in the art.

Figure 1:
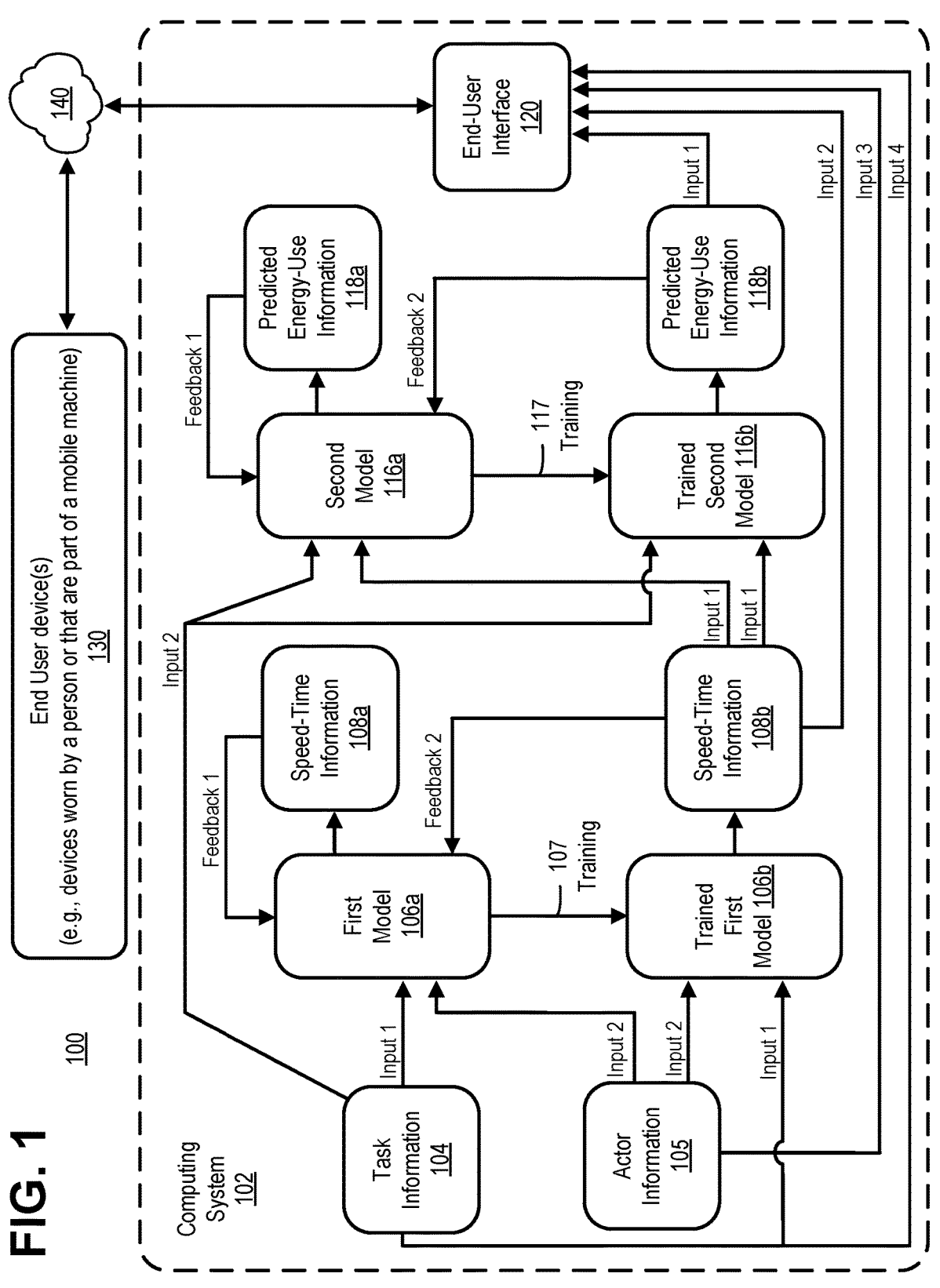
FIG. 1 illustrates an example technical solution to the example technical problems described herein, in accordance with some embodiments of the present disclosure.

FIG. 1 illustrates an example technical solution to the example technical problems described herein. The technical solution, shown in FIG. 1, can include or be a part of the techniques and technologies described herein (such as any one of the methods 300, 400, 500, 600, and 700 shown in FIGS. 3, 4, 5, 6, and 7 respectively) and can provide specific technical solutions to at least overcome the technical problems mentioned in the background section or other parts of the application as well as other technical problems not described herein but recognized by those skilled in the art. FIG. 1 depicts a network 100, such as a computer network, within which a computing system 102 receives various inputs (e.g., see task information 104, actor information 105, speed-time information 108*b*, and predicted energy-use information 118*b*). These inputs and others can be received from different parts of the computing system 102 or other computing systems within the network 100.

As shown in FIG. 1, the computing system includes a first model 106*a*, which can be a deep-learning-based model, that is trained through various machine learning or deep learning techniques (e.g., see training 107), and the result of the training provides a trained model 106*b*. An initial or previous instance of the model (e.g., see model 106*a*) can be used to generate speed-time information 108*a*. The speed-time information generated by such a model can provide feedback to that model to improve the model (e.g., see model 106*a*). Once the model is trained (e.g., see trained model 106*b*), it can be used to generate new machine settings information 108*b*. The new speed-time information 108*b* can be used as feedback in the training of the model (e.g., see first model 106*a* and trained first model 106*b* as well as the training 107).

Also, as shown, the computing system includes a second model 116*a*, which can be a deep-learning-based model that is trained through various machine learning or deep learning techniques (e.g., see training 117) and the result of the training provides a trained model 116*b*. An initial or previous instance of the model (e.g., see model 116*a*) can be used to generate predicted energy-use information 118*a*. The predicted energy-use information generated by such a model can provide feedback to that model to improve the model (e.g., see model 116*a*). Once the model is trained (e.g., see trained model 116*b*), it can be used to generate new predicted energy-use information 118*b*. The new predicted energy-use information 118*b* can be used as feedback in the training of the model (e.g., see second model 116*a* and trained second model 116*b* as well as the training 117).

Further, as shown, the task information 104 can be used as input for the first model 106*a* or the trained first model 106*b*. Also, the task information 104 can be used as input for the second model 116*a* and the trained second model 116*b*. Also, the task information 104 can be used as input for the end-user interface 120. When associated with a mobile machine, the task information 104 can include on-road route information, off-road route information, air or sea routing information, work implement information associated with construction work, military use, security details, farming, forestry, or the like. When associated with a person, the task information 104 can include information related to activities where a person is moving or performing work (such as manual labor, house chores, walking, swimming, running, hiking, climbing, and cycling) and routes or steps for such activities.

As also shown, the actor information 105 can be used as input for the first model 106*a* or the trained first model 106*b*. Also, the actor information 105 can be used as input for the end-user interface 120. The actor information 105 can include any information on a mobile machine or person. When associated with a mobile machine, the actor information 105 can include any information on the machine (such as identification information or make and model information) and information related to the movement or use of the mobile machine (such as predetermined, known or published energy or fuel consumption, energy or fuel efficiency, various acceleration and speed ranges, power outputs, etc.). The actor information 105 can also include information related to movement of the mobile machine such as mobile machine parameters, e.g., mass, aerodynamic drag coefficient, frontal area, drivetrain parameters such as tracked vehicle model or wheeled vehicle model, powertrain parameters such as engine map, motor torque curve, and battery capacity.

As also shown, the speed-time information 108*a* and 108*b* are respective outputs of first model 106*a* and the trained first model 106b. The speed-time information 108a and 108b can also be used as feedback for the first model 106a in its training 107 to produce trained first model 106b. Also, the speed-time information 108b can be used as input for the second model 116a or the trained second model 116b. Also, the speed-time information 108a and 108b can be used as input for the end-user interface 120. The speed-time information 108a and 108b can include tables, graphs, non-graphical data structures, and other forms of associated data or information that shows relationships between speed and time measurements associated with the actor or end-user of the system, such as the person or the mobile machine.

As also shown, the predicted energy-use information 118a and 118b are respective outputs of second model 116a and the trained second model 116b. The predicted energy-use information 118a and 118b can also be used as feedback for the second model 116a in its training 107 to produce trained second model 116b. Also, the predicted energy-use information 118b can be used as input for the end-user interface 120. The predicted energy-use information 118a and 118b can include tables, graphs, non-graphical data structures, and other forms of associated data or information that shows relationships between energy use and different tasks or operations performed by the actor or end-user of the system, such as the person or the mobile machine. The predicted energy-use information 118a and 118b can include determined average energy consumption or fuel efficiency values, for example.

Also, as shown, the end-user interface 120, which can receive the four inputs of task information, actor information, speed-time information, and predicted energy-use information, can use such information to at least partially control a mobile machine or to generate at least part of a user interface (UI) such as a GUI. For example, the interface 120 can provide the aforementioned functionality according to data in the energy-use profile that can include predicted energy-use information. Also, secondary information, such as the task information, actor information, and speed-time information (which can be respective parts of corresponding profiles), can be used in combination with the energy-use profile, by the interface 120, to provide the aforesaid functionality.

Not depicted, in some embodiments, the computing system 102 can be a part of one or more end-user devices (e.g., see one or more end-user devices 130). As shown in FIG. 1, in some examples, the computing system 102 is communicatively coupled or connected with one or more end-user devices (e.g., see the end-user device(s) 130) via network 140 (which can be a part of network 100 as depicted). In some embodiments, the computing system 102 and the inputs and outputs of the computing system are part of a remote system in that the remote system is physically and geographically separated from the end-user device(s) and communicates with a system or controller of the device(s) over a telecommunications or computer network (such as network 140). As shown, in some cases, the communications are via an end-user interface 120, which can include or be a part of a network communications interface. The end-user devices(s) (such as device(s) 130) can include a mobile machine or a device worn or held by a person or a part of a mobile machine or a part of a worn or held device.

The computing system 102 can include electronics such as one or more controllers, sensors, busses, and computers. The computing system 102 includes at least a processor, memory, and a communication interface and can include one or more sensors, which can make a mobile machine or a worn or held device an individual computing device when the mobile machine or the worn or held device includes the computing system. In the case of the network 140 including the Internet, the end-user device(s) 130 as well as the computing system 102 can be considered an Internet of Things (IoT) device. Also, in some embodiments, the computing system 102 or the end-user device(s) 130 can be a part of a cloud computing system. The computing system 102 or the end-user device(s) 130 can include both electronic hardware and software that can integrate between the systems of the computing system and the end-user device(s). And, such hardware and software (such as controllers and sensors and other types of electrical and/or mechanical devices) can be configured to communicate with a remote computing system via the communications network 140.

In some embodiments, a mobile machine (e.g., see end-user device(s) 130) can include any type of machine that moves. Also, mobile machines described herein include mobile machines that include various sensors and that have trackable attributes that can be tracked via such sensors. Mobile machines can include any type of vehicle or machine used for the transport of people or things such as raw materials, payloads, or goods. For instance, mobile machines can include any type of vehicle (e.g., motorcycle, car, bus, bicycle, etc.), automobile, train, watercraft, or aircraft used for the transport of people or objects. Also, mobile machines can include miniaturized machines from miniaturized aircraft and watercraft (e.g., drones) to robots and other types of electro-mechanical equipment performing fine-tuning and motion. Also, mobile machines can include heavy machinery, equipment, and vehicles for military use, construction, farming, forestry, and security details, for example. Mobile machines can include any type of mobile machine for any industrial or consumer use. Mobile machines can include watercraft, aircraft, terrestrial vehicles, automobiles, robots, etc.

In some embodiments, a worn or held device (e.g., see the end-user device(s) 130) can include smart devices such as smartphones and smartwatches. A worn or held device can also include jewelry, other types of worn or held accessories, medical devices, and clothing or elements of clothing that include a computing system or a part of a computing system or a part that can interact with a computing system. A worn or held device can also include virtual-reality headsets and smart eyewear, for example. Furthermore, held devices can include other types of electronics that a human user can hold while moving, such as mobile devices and phones, tablet computers, and laptops.

The network 140 can include one or more local area networks (LAN(s)) and/or one or more wide area networks (WAN(s)). In some embodiments, the network 140 includes the Internet and/or any other type of interconnected communications network. The network 140 can also include a single computer network or a telecommunications network. More specifically, in some embodiments, the network 140 includes a local area network (LAN) such as a private computer network that connects computers in small physical areas, a wide area network (WAN) to connect computers located in different geographical locations, and/or a middle area network (MAN) to connect computers in a geographic area larger than that covered by a large LAN but smaller than the area covered by a WAN.

At least each shown component of the network 100 (including computing system 102, end-user device(s) 130, or network 140 depending on the embodiment) can be or include a computing system that includes memory that includes media. The media includes volatile memory components, non-volatile memory components, or a combination thereof. In general, in some embodiments, each of the computing systems includes a host system that uses memory. For example, the host system writes data to the memory and reads data from the memory. The host system is a computing device that includes a memory and a data processing device. The host system includes or is coupled to the memory so that the host system reads data from or writes data to the memory. The host system is coupled to the memory via a physical host interface. The physical host interface provides an interface for passing control, address, data, and other signals between the memory and the host system.

Figure 2:
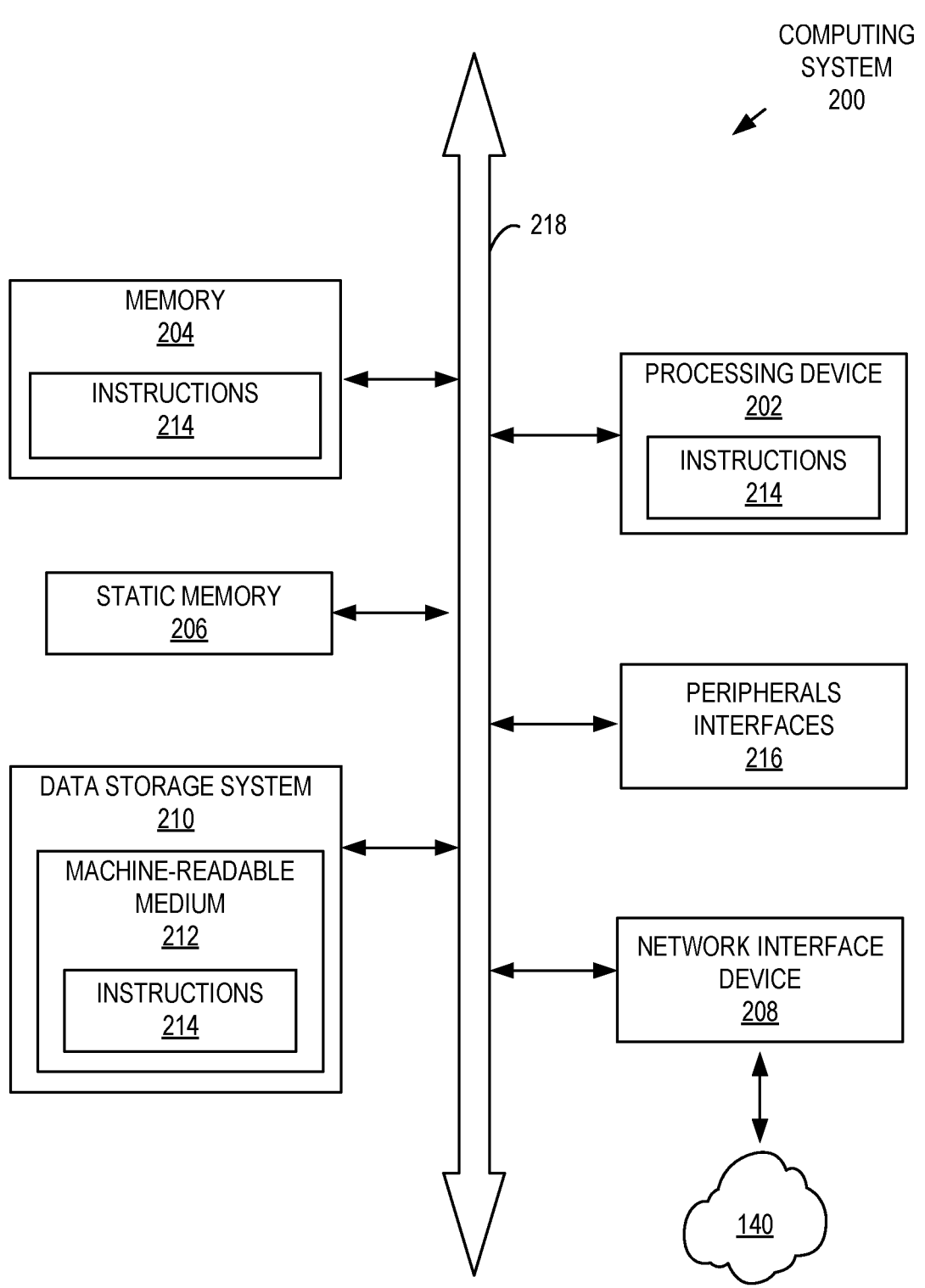
FIG. 2 illustrates a block diagram of example aspects of a computing system, in accordance with some embodiments of the present disclosure.

FIG. 2 illustrates a block diagram of example aspects of a computing system 200 that can implement the technical solution shown in FIG. 1 or each main part of the solution. Also, FIG. 2 illustrates parts of the computing system 200 within which a set of instructions are executed for causing a machine (such as a computer processor or processing device 202) to perform any one or more of the methodologies discussed herein performed by a computing system (e.g., see the method steps of the methods 300, 400, 500, 600, and 700 shown in FIGS. 3, 4, 5, 6, and 7 respectively). In some embodiments, the computing system 200 operates with additional computing systems to provide increased computing capacity in which multiple computing systems operate together to perform any one or more of the methodologies discussed herein that are performed by a computing system.

In some embodiments, the computing system 200 corresponds to a host system that includes, is coupled to, or utilizes memory or is used to perform the operations performed by any one of the computing systems described herein. In some embodiments, the machine is connected (e.g., networked) to other machines in a LAN, an intranet, an extranet, or the Internet. In some embodiments, the machine operates in the capacity of a server in a client-server network environment, as a peer machine in a peer-to-peer (or distributed) network environment, or as a server in a cloud computing infrastructure or environment. In some embodiments, the machine is a personal computer (PC), a tablet PC, a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein performed by computing systems.

The computing system 200 includes a processing device 202, a main memory 204 (e.g., read-only memory (ROM), flash memory, dynamic random-access memory (DRAM), etc.), a static memory 206 (e.g., flash memory, static random-access memory (SRAM), etc.), and a data storage system 210, which communicate with each other via a bus 218. The processing device 202 represents one or more general-purpose processing devices such as a microprocessor, a central processing unit, or the like. More particularly, the processing device can include a microprocessor or a processor implementing other instruction sets, or processors implementing a combination of instruction sets. Or, the processing device 202 is one or more special-purpose processing devices such as an application-specific integrated circuit (ASIC), a field programmable gate array (FPGA), a digital signal processor (DSP), a network processor, or the like. The processing device 202 is configured to execute instructions 214 for performing the operations discussed herein performed by a computing system. In some embodiments, the computing system 200 includes a network interface device 208 to communicate over a communications network. Such a communications network can include one or more local area networks (LAN(s)) and/or one or more wide area networks (WAN(s)). In some embodiments, the communications network includes the Internet and/or any other type of interconnected communications network. The communications network can also include a single computer network or a telecommunications network.

The data storage system 210 includes a machine-readable storage medium 212 (also known as a computer-readable medium) on which is stored one or more sets of instructions 214 or software embodying any one or more of the methodologies or functions described herein performed by a computing system. The instructions 214 also reside, completely or at least partially, within the main memory 204 or within the processing device 202 during execution thereof by the computing system 200, the main memory 204 and the processing device 202 also constituting machine-readable storage media. While the machine-readable storage medium 212 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that causes the machine to perform any one or more of the methodologies of the present disclosure performed by a computing system. The term "machine-readable storage medium" shall accordingly be taken to include solid-state memories, optical media, or magnetic media.

Also, as shown, the computing system 200 includes peripheral interfaces 216 (which can include interfaces for a display and other types of user-interface devices, as well as interfaces for various types of sensors, controllers, and any other type of hardware that interacts with a computing system), and, for example, the peripheral interfaces 216 can implement at least partially any functionality corresponding to any one of the user-interface devices, sensors, or controllers disclosed herein. For example, the peripheral interfaces 216 can include the end-user interface 120 shown in FIG. 1, or it can implement the functionality of the end-user interface. Also, for example, the peripheral interfaces 216 can include the one or more end-user devices 130, which can be any type of user-interface device or UI that can be worn or held by a person (e.g., a smartwatch or phone) or any type of device that can be attached to or is a part of a mobile machine such as any type of sensor or controller of a mobile machine. Also, in some examples, the peripheral interfaces 216 can implement at least partially any of the functionality corresponding to the one or more end-user devices 130, which can be any type of user-interface device or UI that can be worn or held by a person or any type of device that can be attached to or is a part of a mobile machine such as any type of sensor or controller of a mobile machine.

User-interface devices or any UI described herein, can include any space or equipment where interactions between humans and machines occur. A UI described herein allows the operation and control of the machine from a human user, while the machine simultaneously provides feedback information to the user. Examples of a user interface, or UI device include the interactive aspects of computer operating systems (such as graphical user interfaces), machinery operator controls, and process controls.

FIGS. 3 to 7 illustrate methods in accordance with some embodiments of the present disclosure. Methods 300, 400,

500, 600, and 700 of the corresponding figures are performed by any one of the computing systems described herein (e.g., see computing system 102 or 200 depicted in FIGS. 1 and 2 respectively). In some systems of the technologies disclosed herein, any steps of embodiments of the methods described herein are implementable by executing instructions corresponding to the steps, which are stored in memory (such as the instructions 214).

Figure 3:
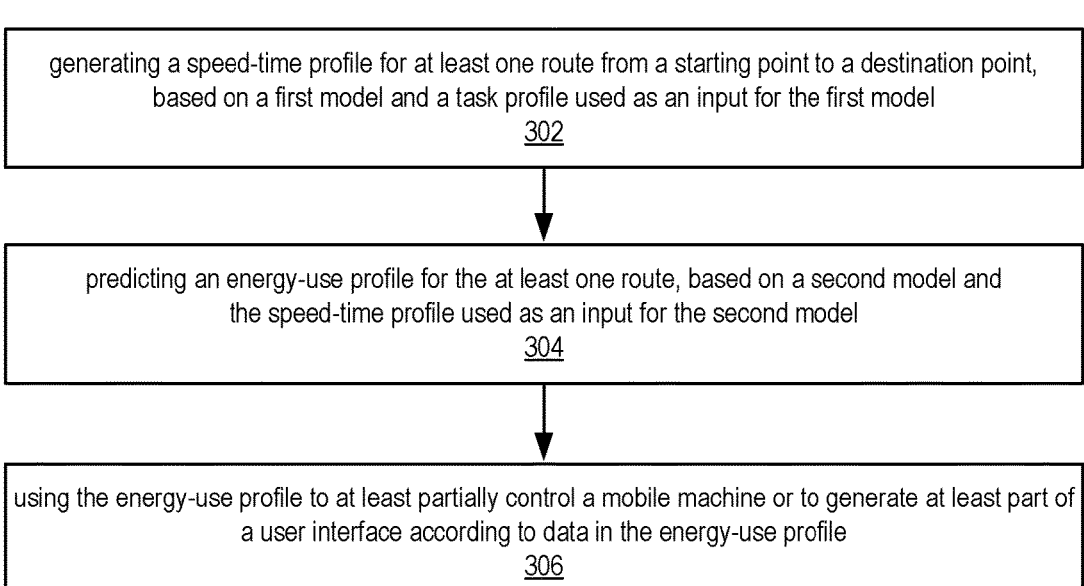

As shown in FIG. 3, method 300 begins with step 302, which includes generating, by a computing system (e.g., see computing system 102 shown in FIG. 1 or computing system 200 shown in FIG. 2), a speed-time profile (e.g., see speed-time information 108a or 108b) for at least one route (such as an off-road route or an on-road route or a combination thereof) from a starting point to a destination point, based on a first model (e.g., see first model 106a or 106b) and a task profile (e.g., see task information 104) used as an input for the first model. In some embodiments, such as where an end-user is a mobile machine, the speed-time profile includes or is part of a driving cycle. I some other embodiments, such as where an end-user is a wearable or holdable smart device, the speed-time profile includes or is part of an exercise routine or cycle. In some embodiments, the task profile includes or is part of a mission profile. And, in some examples, a mission of the mission profile can include a military mission whether the end user is a mobile machine or a device that can be worn or held by a person such as a smart device. At step 304, the method 300 continues with predicting, by the computing system, an energy-use profile (e.g., see predicted energy-use information 118a or 118b) for the at least one route, based on a second model (e.g., see second model 116a or 116b) and the speed-time profile (e.g., see speed-time information 108a or 108b) used as an input for the second model. At step 306, the method 300 continues with using, by the computing system, the energy-use profile to at least partially control a mobile machine (e.g., see end-user device(s) 130) or to generate at least part of a UI such as a GUI (e.g., see end-user interface 120 or end-user device(s) 130), according to data in the energy-use profile.

In some embodiments, the first model is a trained first model (e.g., see training 107 and the trained first model 106b). And, in some embodiments, the second model is a trained second model (e.g., see training 117 and the trained first model 116b). Training can occur through machine learning. And, in some examples, machine learning can include deep learning. In some embodiments, using machine learning or deep learning to train models for energy use prediction as well as using the trained models for energy use prediction to inform, manage, or control an end-user such as a person or a mobile machine involves the application of neural network architectures to analyze and predict the energy use based on historical data (e.g., see scheme 707 shown in FIG. 7, which includes an artificial neural network or ANN). In some cases, by leveraging machine or deep learning, a model can capture complex patterns and dependencies within the various types of information described herein (e.g., see task information 104, actor information 105, speed-time information 108b, and predicted energy-use information 118b), allowing for more efficient and effective energy use prediction, which in some instances can be done in real time when the end-user is performing a task or in route. Such functionality can be provided through method 300 shown in FIG. 3 as well as the other methods described herein when the models have been trained with machine or deep learning techniques. Also, in some examples, the training of the models and the use of such trained models is provided, at least inferentially, through method 300 shown in FIG. 3 well as the other methods described herein that include at least the steps of method 300 and the use of trained models trained through machine or deep learning. Furthermore, some embodiments include combinations of steps from at least method 300, whether or not the models were trained. And, some examples include steps from the other methods described herein that include steps from the method 300.

In some embodiments, the first model is trained through at least one machine learning technique such as a generalized additive model or an autoregressive model. Also, computing schemes such as artificial neural networks, recurrent neural networks, and convolution neural networks can be used with the first model. Also, LSTM (Long Short-Term Memory) networks can be used.

In some cases, the first model includes a pre-processing step based on digital signal processing wherein any one or more of the inputs for the first model or derivatives thereof are pre-processed via digital signal processing, e.g., see step 702 of method 700 shown in FIG. 7. In such cases and others, at least part of the pre-processed data of the first model can be inputted into an artificial neural network (ANN) to further enhance the data for the determination of the speed-time information or profile, e.g., see steps 704 and 706 of method 700. Also, in such examples and others, the output of the ANN or a derivative thereof can be used to enhance one or more of the inputs for the determination of the speed-time profile or information, e.g., see step 708 of method 700.

In some embodiments, the second model is trained through at least one machine learning technique such as an ensemble learning model, a Bayesian model, or a regression model like a random forest or gradient descent model). Also, computing schemes such as artificial neural networks and convolution neural networks can be used with the second model. Also, recurrent neural networks (like LSTM networks) can be used.

In some cases, the second model includes a pre-processing step based on digital signal processing wherein any one or more of the inputs for the second model or derivatives thereof are pre-processed via digital signal processing, e.g., see step 702 of method 700 shown in FIG. 7. In such cases and others, at least part of the pre-processed data of the first model can be inputted into an ANN to further enhance the data for the determination of the predicted energy-use information or profile, e.g., see steps 704 and 706 of method 700. Also, in such examples and others, the output of the ANN or a derivative thereof can be used to enhance one or more of the inputs for the determination of the predicted energy-use information or profile, e.g., see step 708 of method 700.

In some cases where the end user is a mobile machine, the mobile machine is a vehicle. And, in such cases and others, the profiles can be for a mobile machine, a vehicle, or a person. When the energy-use profile is for a machine or vehicle, the energy-use profile can include information related to the use of an internal combustion engine, an electric motor, or any other type of machine designed to convert one or more forms of energy into mechanical energy or heat energy as well as the use of a primary or auxiliary system.

In some embodiments, the energy-use profile can include information related to driving a mobile machine or vehicle over the ground, in water, or the air. Also, in some cases, the energy-use profile can include information related to using implements of the mobile machine that are used for tasks beyond the driving or flying of the mobile machine or the vehicle. Such tasks can include heating or cooling the machine, using electromagnetic communications or navigation systems, operating weapons systems, operating farm implements, using vision systems, or any other mobile machine auxiliary energy demand. Also, such tasks can include cooling the vehicle, using RADAR or radio systems, using weapons systems, and using implement systems such as those used in construction, forestry, farming, security, military use, etc. Also, energy consumption by computing resources on the mobile machine can be part of a task.

In some embodiments, generating one or more of the profiles takes into account one or more variables related to a terrain or body of water with varying features and ways of moving through the terrain or body of water (e.g., variables can include friction, slippage, etc.). In some embodiments, the task profile includes information related to the one or more variables related to related to a terrain and/or body of water with varying features and ways of moving through the terrain and/or body of water (e.g., variables can include slippage, etc.).

In some embodiments, when the energy-use profile is for a device that can be worn or held by a person, the energy-use profile includes information related to a person such as use of the metabolism, blood oxygen level, temperature, or heart rate of the person. The energy-use profile can include information related to the movement of a person over the ground or in water as well as information related to other physical operations performable by a human other than for movement over the ground or in water, wherein such tasks include lifting or carrying weight, maintaining body temperature, performing mechanical work, exerting mental effort, or other energy-consuming physiological tasks.

In some embodiments, the generating of the speed-time profile at step 302 is also based on an actor profile used as a second input for the first model, and the actor profile input and the task profile input are two separate inputs of the first model. The actor profile can include a mobile-machine profile input, a vehicle profile input, or a person profile input. The actor profile in some examples can include information related to variable payload weight and auxiliary power requirements such as when the vehicle or the mobile machine includes auxiliary equipment such as construction systems, weapons systems, communications systems, heating ventilation and cooling (HVAC), and external electric charging. In some cases, the speed-time profile is physics-compliant at each chronological step of the speed-time profile.

In some embodiments, the predicting of the energy-use profile at step 304 includes the second model predicting energy consumption over a route for each chronological step of the speed-time profile. In some examples, the predicted energy-use profile is also based on the task profile used as a second input for the second model, and the speed-time profile and the task profile input are two separate inputs of the second model. In some embodiments, the predicting of the energy-use profile includes using a road-load determination. In some examples, the road-load determination is enhanced through machine learning to capture terrain-specific energy use before its use in the predicting the energy-use profile. In some cases, the road-load determination includes a pre-processing step based on digital signal processing, e.g., see step 702 of method 700 shown in FIG. 7. In such cases and others, at least part of the pre-processed data for determining road load can be inputted into an ANN, e.g., see steps 704 and 706 of method 700. Also, in such examples and others, the output of the ANN or a derivative thereof can be used to enhance one or more of the inputs for the prediction of the energy-use profile or the energy-use information, e.g., see step 708 of method 700.

In some embodiments, the second model is part of an energy-management module having separate models for generating range extender control, state of charge profiles, mission profiles, and probability of completion. In some embodiments, the first model generates a route-optimized drive cycle, and the speed-time profile is generated according to the route-optimized drive cycle. In some cases, the second model includes a calibrated physics-based vehicle or powertrain model, and the energy-use profile is generated according to the calibrated physics-based vehicle or powertrain model.

Figure 4:
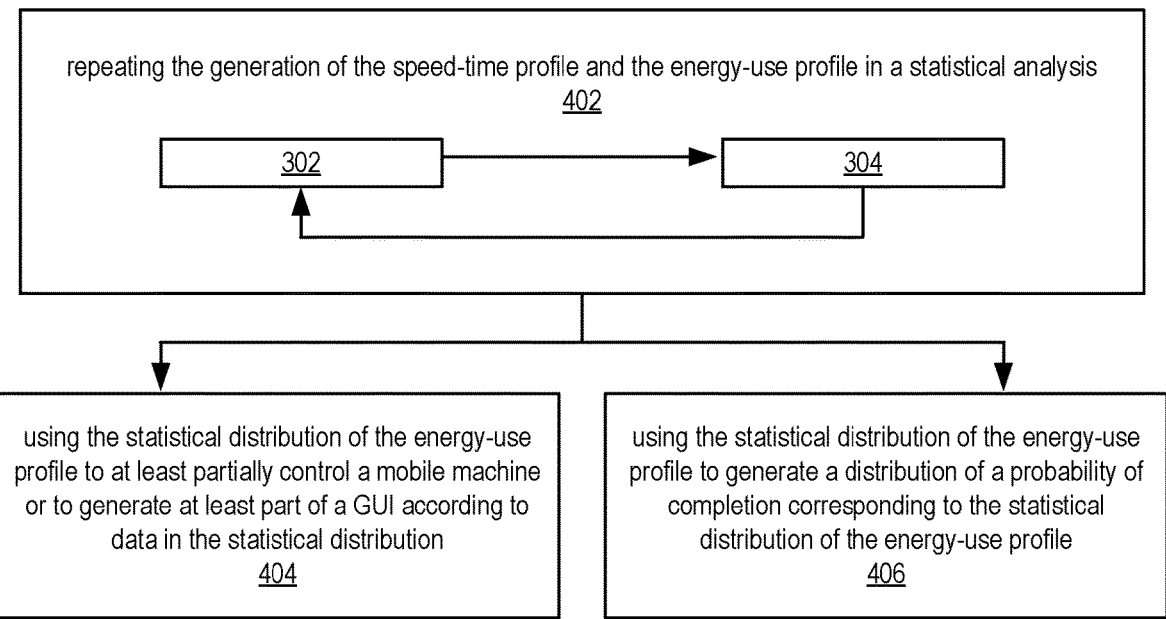

In some embodiments, the method 300 can be expanded to include repeating the generation of the speed-time profile and the energy-use profile in a statistical analysis to generate a statistical distribution. As shown in FIG. 4, method 400 starts with step 402 which includes repeating, by the computing system, the generation of the speed-time profile (at step 302) and the energy-use profile (at step 304) in a statistical analysis. In some cases, the repeating of the generation of the profiles can be a part of a Monte Carlo simulation for statistical analysis. The Monte Carlo simulation can be used to generate a statistical distribution of the energy-use profile. Method 400, at step 404, continues with the computing system using the statistical distribution of the energy-use profile to at least partially control a mobile machine or to generate at least part of a GUI, according to data in the statistical distribution. And, at step 406, the method 400 continues with the computing system using the statistical distribution of the energy-use profile to generate a distribution of a probability of completion corresponding to the statistical distribution of the energy-use profile. In some embodiments, the method 400, at step 404, can further include the computing system using the distribution of the probability of completion to control a mobile machine or to generate at least part of a UI, such as a GUI, according to data in the distribution of the probability of completion.

In some embodiments, as shown in FIG. 5, the method 300 can be expanded to include emulating a state (such as the current state) of the mobile machine controlled according to the energy-use profile and determining a prediction error based on a difference between the emulation and a predicted state of the mobile machine in the energy-use profile. As shown, method 500 includes the steps of method 300 and, at step 502, includes emulating, by the computing system, the state of the mobile machine controlled according to the energy-use profile. And, at step 504, the method 500 continues with determining, by the computing system, a prediction error in the prediction of the energy-use profile based on a difference between the emulation of the state of the mobile machine and a predicted state of the mobile machine in the energy-use profile. Furthermore, at step 506, the method 500 continues with updating, by the computing system, the first model or the second model according to the prediction error. And, at step 508, the method 500 continues with reusing, by the computing system, the first model and the second model after the update to enhance the accuracy of the energy-use profile.

In some embodiments, as shown in FIG. 6, the method 300 can be expanded to include emulating a state (such as the current state) of a person directed according to the energy-use profile and determining a prediction error in the prediction of the energy-use profile based on a difference between the emulation of the state of the person and a predicted state of the person in the energy-use profile. As shown, method 600 includes the steps of method 300 and, at step 602, includes emulating, by the computing system, the state of a person directed according to the energy-use profile. And, at step 604, the method 600 continues with determining, by the computing system, a prediction error in the prediction of the energy-use profile based on a difference between the emulation of the state of the person and a predicted state of the person in the energy-use profile. Furthermore, at step 606, the method 600 continues with updating, by the computing system, the first model or the second model according to the prediction error. And, at step 608, the method 600 continues with reusing, by the computing system, the first model and the second model after the update to enhance the accuracy of the energy-use profile.

In some embodiments, the emulation includes a state of the mobile machine or person by monitoring local position data including GPS or vehicle data including those broadcasted on a controller area network (CAN) in the case of the mobile machine. In some embodiments, a digital twin recalculates the energy prediction at each time step and compares the task-related data from the field with the predicted values to run an anomaly detection extension and to further tune the actor model (e.g., a vehicle model or person model) to better capture real-time behavior of the corresponding actor. In some cases, a digital twin can be a model that runs in real time comparing the actual state versus the predicted state of the actor.

In some embodiments, anomaly detection identifies unforeseen deviations of the prediction total energy and traction energy consumption from the actual estimations at regular intervals and tries to diagnose potential faults such as clogged intake, flat tire, increased auxiliary energy use, etc. In the case of a mobile machine or vehicle, in some examples, the results of such a process are used to update variables of the actor model to enhance its prediction capabilities. In some embodiments, if route energy prediction needs to be recalculated, a routine determines the cause of the change in energy use, and the energy prediction model is updated accordingly. And, once the update occurs, the energy prediction is re-run over each speed trace. In some examples, a new predicted value is provided via the UI (such as presented via a GUI) with any information about the change.

In some embodiments, the method 300 or other methods described herein can further include using the energy-use profile to enhance range estimation for contested or off-road environments. In some cases, the enhanced range estimation occurs by providing a predicted vehicle range over multiple terrain and mission scenarios. The enhanced range estimation can occur by providing mission probability of completion in some examples. The enhanced range estimation occurs by providing estimated fuel use at every point throughout the route, in some cases. In some examples, the enhanced range estimation occurs by enhancing engine extender, generator extender, or range extender used to meet mission objectives such as silent operation (e.g., in stealth zones), thermal signature, range, energy use, or efficiency. In some instances, the enhanced range estimation occurs by estimating energy use for vehicles on off-road surfaces.

Related to the method 300 shown in FIG. 3, in some embodiments, a method embodiment includes generating a speed-time profile based on a first model and a task profile used as an input for the first model. Such a method also includes predicting an energy-use profile based on a second model and the speed-time profile as an input for the second model. And, the method also includes using the energy-use profile to generate at least part of a UI, such as a GUI, according to data in the energy-use profile. In some examples, the method further includes emulating a state (such as the current state) of an actor directed or controlled according to the energy-use profile as well as determining a prediction error in the prediction of the energy-use profile based on a difference between the emulation of the state of the person and a predicted state of the person in the energy-use profile. In some examples, the method includes providing the prediction error in the UI (such as including the error graphically in a GUI).

Related to the method 300 shown in FIG. 3, in some embodiments, a method embodiment includes generating a speed-time profile based on a first model and a task profile used as an input for the first model. The method also includes predicting an energy-use profile based on a second model and the speed-time profile as an input for the second model. The method also includes using the energy-use profile to control a mobile machine according to data in the energy-use profile to reduce a noise signature or to decrease emissions in a particular area of a route.

FIG. 7 shows a method 700 that can be a sub-method of step 302 or 304 of method 300 or any other method step described herein related to the generation of the profiles. FIG. 7 illustrates a data processing method that includes digital signal processing and a trained computing scheme that includes at least one ANN. In some embodiments, within step 302 or 304 or any other steps described herein related to generation of the profiles, the computing system can execute complex processes that include running signal processing procedures or ANN-based analysis on data from one or more sensors or one or more of the inputs described herein (e.g., see the inputs illustrated in FIG. 1) to enhance at least some of the speed-time profile or energy-use profile determinations or some of the corresponding data processing steps (e.g., see steps 702 to 708). In some examples of the methods, the determination of various attributes of an actor, an environment, or one of the inputs described herein is based at least partially on digital signal processing (e.g., see step 702). In some instances, the digital signal processing occurs prior to an ANN-based analysis (such as an ANN-based computer vision analysis) as a pre-processing step to generate enhanced input for the ANN-based analysis (e.g., see steps 702 and 704). Also, even more specifically, in such cases, the ANN-based analysis includes inputting the enhanced input into an ANN (e.g., see scheme 707 and step 704), and the determination of the attributes in the data is based at least on the output of the ANN (e.g., see steps 706 and 708).

In general, some examples include the ANN-based analysis including inputting an input into an ANN (e.g., see scheme 707), and the determination of the attributes of at least one of the inputs or profiles described herein is based at least on the output of the ANN (e.g., see step 708). The ANN can include or can be a part of a deep learning process that determines attributes of at least one of the inputs or profiles described herein or can be a basis for the determination of attributes of at least one of the inputs or profiles described herein. In such cases, the deep learning process can include a convolutional neural network (CNN) or a recurrent neural network (RNN) of one or more artificial neural networks. Also, LSTM networks can be used.

As mentioned, some embodiments relate to enhancing energy-use predictions for use by mobile machines and their operators. As an example, vehicles require energy to drive and to power auxiliary systems. Predicting the future energy use of vehicles for a given route or mission can be directly related to the amount of fuel consumed in an engine or fuel cell propulsion system. For electric and hybrid electric vehicles, it is also directly related to the amount of battery energy used. For human-powered or human/electric-powered vehicles, it is related to the amount of caloric effort required by the human.

Energy prediction can be used by vehicle operators or logistics planners to estimate the amount of fuel or battery energy that will be required to complete a route or mission. It can also be used in hybrid vehicles, where two energy storage sources are available, to control which energy source will be used during the route to optimize a desired param- eter. Such optimizations could include fuel use minimization or battery use minimization. Fuel efficiency could also be optimized. Energy prediction ahead of driving on a route can also be used to determine whether the vehicle can complete the route as desired, or whether a route or energy use reduction is necessary. Energy use prediction could be used in planning to determine whether a vehicle can operate in all-electric mode (without an engine) to minimize vehicle noise signature, or for geofencing to minimize emissions in a particular area and/or to meet regulatory requirements.

Predicting energy for on-road driving can be done more easily than for off-road driving because rolling resistance is generally consistent on pavement and tire slip is minimal. However, for multi-terrain vehicles, rolling resistance is highly variable depending on the terrain traversed. Tires and tracks both have significant slippage on loose or wet sur- faces, increasing energy consumption for a given speed. Further, some off-road vehicles, like those used in the military, have highly variable payload weight and auxiliary power requirements. Auxiliary equipment includes weapons systems, communications systems, heating ventilation and cooling (HVAC), and external electric charging. Also, with on-road driving, road networks can be well defined in map software (route can be map matched); whereas for off-road driving, a route cannot be well defined in advance. And, the technologies described herein are able to predict energy for mobile machines (or humans) traveling on unrecorded or undefined routes (e.g., such as known only by the GPS trace and not historic data of mobile actors passing through such routes).

During the planning phase of a trip or mission, it is desired to predict the amount of energy that a vehicle will consume in the future given a route that will be traveled. It is also desired to allow that prediction to adapt to alterations or changes in the route during the mission or trip. This inno- vation predicts the amount of energy to be used in a vehicle on a future trip using a model that operates on synthetic driving cycles. A powertrain model is used to model the flow of energy within the vehicle. The vehicle can be conven- tionally powered by an internal combustion engine (ICE) or it can be a battery-electric vehicle. Alternatively, the vehicle could be powered by both an electric motor and an ICE.

In some embodiments, such as embodiments related to the example network shown in FIG. 1 and the method depicted in FIG. 3, a computing system of a vehicle can have the ability to measure time series data from the vehicle such as from the vehicle's CAN, a connected computational resource (e.g., an edge computer or cloud computer), user interface, and adaptive energy prediction system including computer respective computer hardware and software. The operation and use of the energy prediction system can be utilized in both the planning stage and the monitoring stage of a mission. At the planning stage, the software uses a mission profile input which can include a route with path location trace, elevation profile, and surface categorization along with stop locations, silent locations, vehicle options, and other accessory inputs. Once input, the data is sent to another module to generate a synthetic speed-time profile that is physics-compliant at each time step. This speed-time profile or drive cycle can then be sent into the energy management software where a physics-based vehicle or powertrain model predicts the energy consumption over the route for each speed point. The vehicle model can use the road load equation which can be tuned using machine learning to better capture terrain-specific energy use.

Once the energy prediction is developed, in some examples, a Monte Carlo simulation of multiple energy management runs is used to generate a statistical distribution of expected outcomes. This information is provided to the user along with the distribution of expected energy use and the statistical ability to complete the route called the prob- ability of completion. This is performed for each mission iteration the user is looking to perform allowing the user to choose between different mission characteristics. The user can then select a mission to perform and begin the mission.

In some cases, during mission execution, a digital twin module emulates the current state of the vehicle by moni- toring the CAN signals and GPS data for a software-in-the- loop simulation. The digital twin can recalculate the energy prediction at each time step and compare the dynamic vehicle data with the predicted values to run an inbuilt anomaly detection extension and to further tune the vehicle model to better capture its current behavior. The anomaly detection can search for unforeseen deviations of the pre- diction total energy and traction energy consumption from the actual estimations at regular intervals and tries to diag- nose potential faults such as clogged intake, flat tire, and increased auxiliary energy use. Such results can be used to update the vehicle energy model characteristics to obtain an accurate prediction.

In some examples, if route energy prediction needs to be recalculated, a routine determines the cause of the change in energy use, and the energy prediction model is updated accordingly. Once the update occurs, the energy prediction is re-run over each speed trace, and a new predicted value is displayed to the user along with any information about the change.

With respect to some embodiments, range estimation for contested and off-road environments is challenging. And, many of the technical solutions described herein overcome such a technical problem by providing predicted vehicle range over multiple terrain and mission scenarios. Also, the solutions can provide mission probability of completion. Furthermore, the solutions can provide estimated fuel use at every point throughout the route. Also, the solutions can provide enhanced engine extender use, generator extender use, or range extender use to meet mission objectives such as silent operation (e.g., in stealth zones), thermal signature, range, energy use, or efficiency. Furthermore, the solutions can provide estimates of energy use for vehicles on off-road surfaces.

Also, with respect to some embodiments, the systems described herein, such as the computing systems illustrated in FIGS. 1 and 2, improve upon existing solutions such as known maps routing applications and automotive energy prediction apps. Where these applications are lacking is their ability to consider or compensate for off-road terrain or a broad trajectory space with near-infinite path options. Many of the technical solutions described herein overcome such issues and can use a physics-informed model to provide a projected speed and energy profile over a terrain.

Some portions of the preceding detailed descriptions have been presented in terms of algorithms and symbolic repre- sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computing system, or similar electronic computing device, which manipulates and transforms data represented as physical (electronic) quantities within the computing system's registers and memories into other data similarly represented as physical quantities within the computing system memories or registers or other such information storage systems.

Furthermore, with respect to some examples, off-road energy prediction is challenging to model with physics alone. Many of the solutions described herein can use machine learning to handle complex interactions in off-road environments which is not available from other telematics or energy management solutions. Also, for example, many of the solutions described herein can be used for military applications so energy use can be identified by use type to help reduce energy use based on a mission's strategic objectives. And, many of the solutions described herein can enhance stealth operation and predict vehicle thermal signature for stealth operation. The systems described herein can operate remotely or within the vehicle. In some cases, the systems can operate at least partially through cloud computing. Such systems allow a commander to monitor the vehicle's operation using the modeled mission profile with limited communication between the vehicle and the cloud. The cloud model can be updated when a significant deviation from the mission profile or energy use is identified by the vehicle. When a model update is needed, the computing system for the vehicle can push the new mission parameters to the cloud thus limiting the needed communication between the two which can be challenging and dangerous in contested environments.

While the invention has been described in conjunction with the specific embodiments described herein, such as embodiments for military use of the computing systems described herein, it is evident that many alternatives, combinations, modifications and variations are apparent to those skilled in the art and that embodiments can be applied to many different types of applications and use cases. Accordingly, the example embodiments of the invention, as set forth herein are intended to be illustrative only, and not in a limiting sense. Various changes can be made without departing from the spirit and scope of the invention.

What is claimed is:

1. A method, comprising:
generating, by a computing system, a speed-time profile for a route from a starting point to a destination point, based on a first model and a task profile used as an input for the first model;

predicting, by the computing system, an energy-use profile for the route, based on a second model and the speed-time profile used as an input for the second model;
using, by the computing system, the energy-use profile to control a hybrid vehicle according to data in the energy-use profile, wherein the hybrid vehicle comprises two energy sources, and wherein the control of the hybrid vehicle comprises controlling, by a controller of a hybrid vehicle, use of the two energy sources during the route according to the data in the energy-use profile;
repeating the generation of the speed-time profile and predicting of the energy-use profile in a statistical analysis to generate a statistical distribution; and
using the statistical distribution of the energy-use profile to further control the hybrid vehicle according to data in the statistical distribution, and wherein the control of the hybrid vehicle further comprises controlling, by the controller of the hybrid vehicle, use of the two energy sources during the route according to the statistical distribution of the energy-use profile.

2. The method of claim 1, further comprising:
using the statistical distribution of the energy-use profile to generate a graphical user interface according to data in the statistical distribution;
emulating a state of the hybrid vehicle controlled according to the energy-use profile;
determining a prediction error in the prediction of the energy-use profile based on a difference between the emulation of the state of the hybrid vehicle and a predicted state of the hybrid vehicle in the energy-use profile;
updating the first model or the second model according to the prediction error;
reusing the first model and the second model after the update to enhance the accuracy of the energy-use profile; and
providing the prediction error in the graphical user interface graphically.

3. The method of claim 2, further comprising using the statistical distribution of the energy-use profile to generate a distribution of a probability of completion corresponding to the statistical distribution of the energy-use profile.

4. The method of claim 3, further comprising using the distribution of the probability of completion to control the hybrid vehicle and to generate the graphical user interface according to data in the distribution of the probability of completion.

5. The method of claim 4,
wherein the generating the speed-time profile is also based on an actor profile used as a second input for the first model, and
wherein the actor profile and the task profile are two separate inputs of the first model.

6. The method of claim 5, wherein the actor profile comprises a hybrid vehicle profile input.

7. The method of claim 6, wherein the predicting the energy-use profile comprises the second model predicting energy consumption over the route for each chronological step of the speed-time profile.

8. The method of claim 6,
wherein the predicted the energy-use profile is also based on the task profile used as a second input for the second model, and
wherein the speed-time profile and the task profile are two separate inputs of the second model.

9. The method of claim 6, wherein the predicting the energy-use profile comprises using a road-load determination, and wherein the road-load determination is enhanced through machine learning to capture terrain-specific energy use prior to its use in the predicting of the energy-use profile.

10. The method of claim 6, wherein the first model generates a route-optimized drive cycle, and wherein the speed-time profile is generated according to the route-optimized drive cycle.

11. The method of claim 6, wherein the repeating of the generation of the speed-time profile and the prediction of the energy-use profile is a part of a Monte Carlo simulation, and wherein the method further comprises using the Monte Carlo simulation to generate the statistical distribution of the energy-use profile.

12. A method, comprising:

generating, by a computing system, a speed-time profile for a route from a starting point to a destination point, based on a first model and a task profile used as an input for the first model;

predicting, by the computing system, an energy-use profile for the route, based on a second model and the speed-time profile used as an input for the second model;

using, by the computing system, the energy-use profile to control a mobile machine according to data in the energy-use profile, wherein the control of the mobile machine comprises controlling, by a controller of the mobile machine, use of an energy source during the route according to the data in the energy-use profile;

repeating the generation of the speed-time profile and predicting of the energy-use profile in a statistical analysis to generate a statistical distribution;

using the statistical distribution of the energy-use profile to further control the mobile machine according to data in the statistical distribution, and wherein the control of the mobile machine further comprises controlling, by the controller of the mobile machine, use of the energy source during the route according to the statistical distribution of the energy-use profile;

using the statistical distribution of the energy-use profile to generate a graphical user interface according to data in the statistical distribution;

emulating a state of the mobile machine controlled according to the energy-use profile;

determining a prediction error in the prediction of the energy-use profile based on a difference between the emulation of the state of the mobile machine and a predicted state of the mobile machine in the energy-use profile;

updating the first model or the second model according to the prediction error;

reusing the first model and the second model after the update to enhance the accuracy of the energy-use profile; and providing the prediction error in the graphical user interface graphically.

13. The method of claim 12, wherein the predicting the energy-use profile comprises the second model predicting energy consumption over the route for each chronological step of the speed-time profile.

14. The method of claim 13, wherein the predicted the energy-use profile is also based on the task profile used as a second input for the second model, and wherein the speed-time profile and the task profile are two separate inputs of the second model.

15. The method of claim 14, wherein the predicting the energy-use profile comprises using a road-load determination, and wherein the road-load determination is enhanced through machine learning to capture terrain-specific energy use prior to its use in the predicting of the energy-use profile.

16. A method, comprising:

generating, by a computing system, a speed-time profile for a route from a starting point to a destination point, based on a first model and a task profile used as an input for the first model, wherein the generating the speed-time profile is also based on an actor profile used as a second input for the first model, wherein the actor profile and the task profile are two separate inputs of the first model, and wherein the actor profile comprises a mobile-machine profile input;

predicting, by the computing system, an energy-use profile for the route, based on a second model and the speed-time profile used as an input for the second model;

using, by the computing system, the energy-use profile to control a mobile machine according to data in the energy-use profile, wherein the control of the mobile machine comprises controlling, by a controller of the mobile machine, use of an energy source during the route according to the data in the energy-use profile;

repeating the generation of the speed-time profile and predicting of the energy-use profile in a statistical analysis to generate a statistical distribution; and using the statistical distribution of the energy-use profile to further control the mobile machine according to data in the statistical distribution, and wherein the control of the mobile machine further comprises controlling, by the controller of the mobile machine, use of the energy source during the route according to the statistical distribution of the energy-use profile.

17. The method of claim 16, wherein the predicting the energy-use profile comprises the second model predicting energy consumption over the route for each chronological step of the speed-time profile.

18. The method of claim 17, wherein the predicted the energy-use profile is also based on the task profile used as a second input for the second model, and wherein the speed-time profile and the task profile are two separate inputs of the second model.

19. The method of claim 18, wherein the predicting the energy-use profile comprises using a road-load determination, and wherein the road-load determination is enhanced through machine learning to capture terrain-specific energy use prior to its use in the predicting of the energy-use profile.

20. The method of claim 18, wherein the first model generates a route-optimized drive cycle, and wherein the speed-time profile is generated according to the route-optimized drive cycle.

\* \* \* \* \*